United States Patent
Cho et al.

(10) Patent No.: US 9,874,675 B2
(45) Date of Patent: Jan. 23, 2018

(54) QUANTUM DOT PANEL AND DISPLAY DEVICE INCLUDING THE SAME

(71) Applicant: SAMSUNG DISPLAY CO., LTD., Yongin-si, Gyeonggi-do (KR)

(72) Inventors: Don Chan Cho, Seongnam-si (KR); Nam Seok Roh, Seongnam-si (KR); Yu Jin Kim, Hwaseong-si (KR); Sang Ji Park, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 136 days.

(21) Appl. No.: 14/931,765

(22) Filed: Nov. 3, 2015

(65) Prior Publication Data
US 2016/0209572 A1 Jul. 21, 2016

(30) Foreign Application Priority Data

Jan. 21, 2015 (KR) ........................ 10-2015-0010086

(51) Int. Cl.
| | |
|---|---|
| *F21V 8/00* | (2006.01) |
| *B32B 3/30* | (2006.01) |
| *B82Y 20/00* | (2011.01) |
| *B82Y 30/00* | (2011.01) |

(52) U.S. Cl.
CPC ......... *G02B 6/0026* (2013.01); *G02B 6/0023* (2013.01); *B32B 3/30* (2013.01); *B32B 2457/20* (2013.01); *B32B 2551/00* (2013.01); *B82Y 20/00* (2013.01); *B82Y 30/00* (2013.01); *G02B 6/0068* (2013.01); *G02B 6/0073* (2013.01); *Y10S 977/774* (2013.01); *Y10S 977/952* (2013.01)

(58) Field of Classification Search
CPC ............................ G02B 6/0023; G02B 6/0026
See application file for complete search history.

(56) References Cited

U.S. PATENT DOCUMENTS

| | | | |
|---|---|---|---|
| 8,412,053 B2 * | 4/2013 | Bianchi ................. | H04B 10/90 372/73 |
| 8,783,930 B2 * | 7/2014 | Park ..................... | G02B 6/0068 349/61 |
| 2010/0110728 A1 | 5/2010 | Dubrow et al. | |

(Continued)

FOREIGN PATENT DOCUMENTS

| KR | 10-2006-0125347 A | 12/2006 |
|---|---|---|
| KR | 10-2010-0029237 A | 3/2010 |

(Continued)

*Primary Examiner* — Robert May
(74) *Attorney, Agent, or Firm* — Innovation Counsel LLP

(57) ABSTRACT

The present invention provides a quantum dot panel, including: a first substrate; a plurality of first cavities formed on the first substrate, so that adjacent ones of the cavities are separated from each other; a first roof layer covering the cavities so as to at least partially define the cavities; quantum dots contained in the first cavities; and a distribution layer in which the quantum dots are distributed and which is disposed within the first cavities. The quantum dot panel according to exemplary embodiments of the present invention includes quantum dots contained within predetermined structures formed on the substrate, thereby improving reliability of the quantum dot panel and simplifying the manufacturing process thereof.

20 Claims, 11 Drawing Sheets

(56) References Cited

U.S. PATENT DOCUMENTS

| | | | | |
|---|---|---|---|---|
| 2013/0271700 A1* | 10/2013 | Nakamura | ............ | G02B 6/0026 349/65 |
| 2014/0153218 A1* | 6/2014 | Hyun | ................ | G02F 1/133615 362/84 |
| 2015/0048348 A1* | 2/2015 | Huang | .................. | H01L 27/322 257/40 |
| 2015/0185381 A1* | 7/2015 | Wu | ........................ | G02B 5/201 349/106 |
| 2015/0212260 A1* | 7/2015 | Li | ........................ | G02B 6/0086 362/608 |

FOREIGN PATENT DOCUMENTS

| | | |
|---|---|---|
| KR | 10-2012-0099704 A | 9/2012 |
| KR | 10-2013-0104862 A | 9/2013 |
| WO | 2008042337 A2 | 4/2008 |

\* cited by examiner

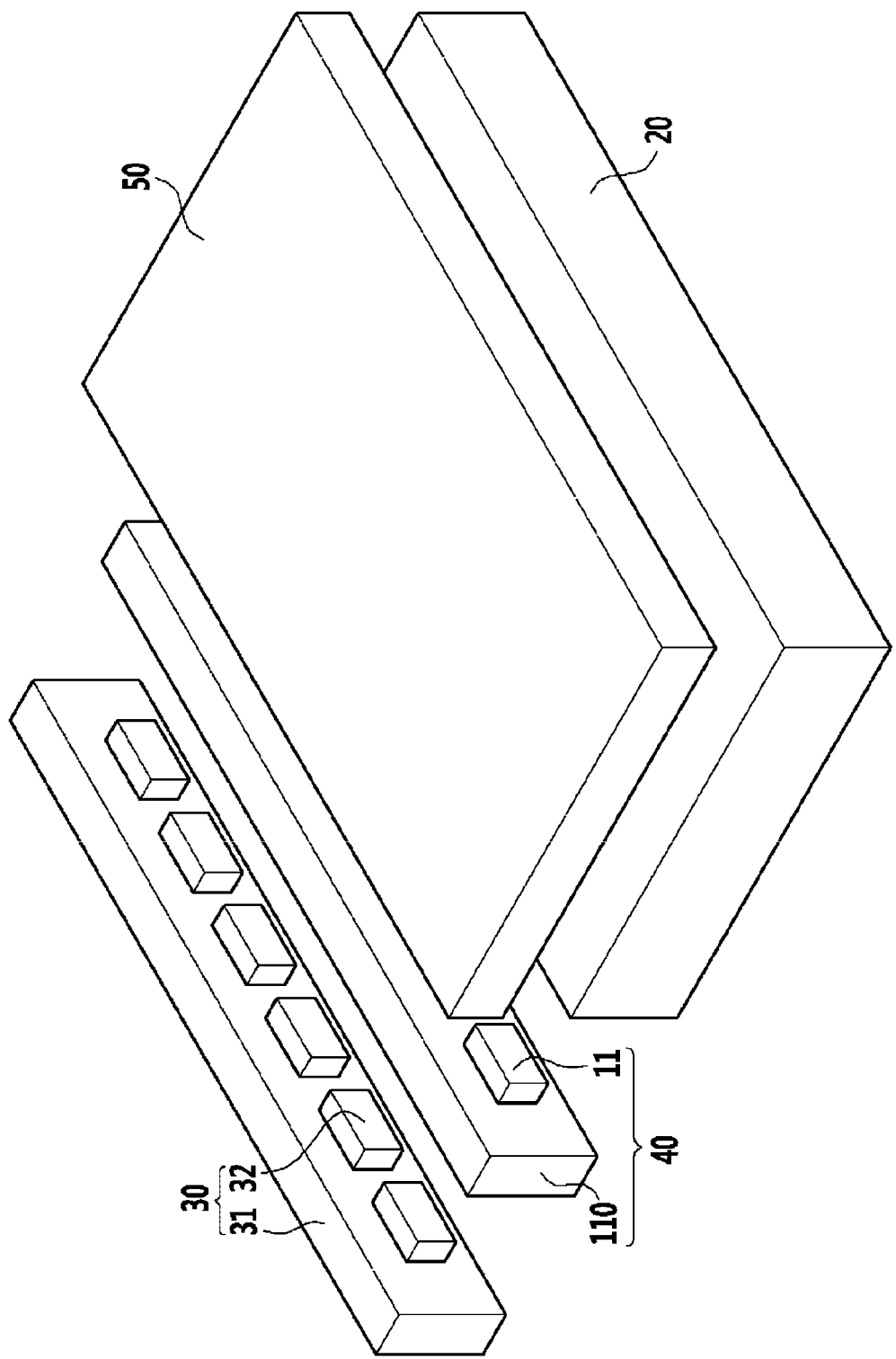

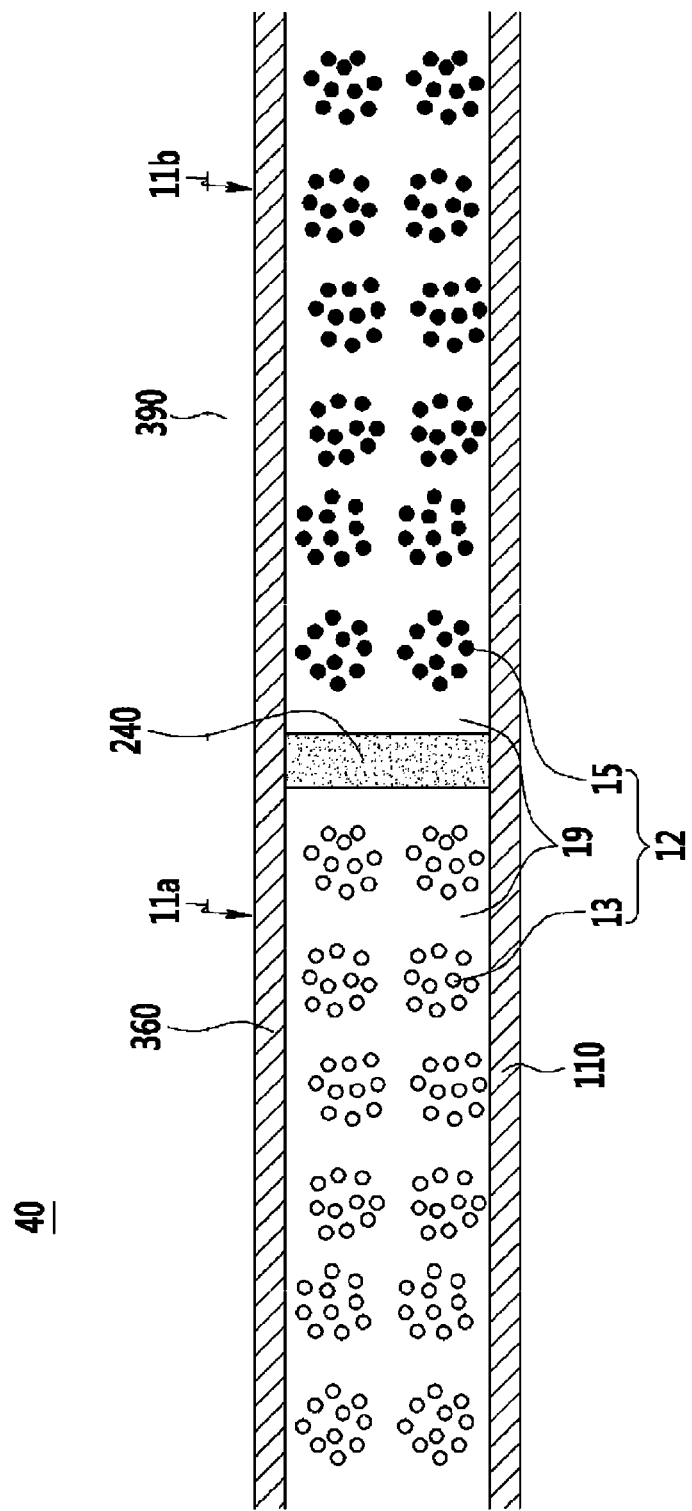

QUANTUM DOT PANEL AND DISPLAY DEVICE INCLUDING THE SAME

CROSS-REFERENCE TO RELATED APPLICATION

This application claims priority to, and the benefit of, Korean Patent Application No. 10-2015-0010086 filed in the Korean Intellectual Property Office on Jan. 21, 2015, the entire contents of which are incorporated herein by reference.

BACKGROUND (a) Field

Embodiments of the present invention relate generally to flat panel displays. More specifically, embodiments of the present invention relate to quantum dot panels for use in flat panel displays.

(b) Description of the Related Art

Unlike emissive displays such as plasma display panels (PDPs), field emission displays (FEDs), etc., liquid crystal displays (LCDs) are non-emissive displays that are incapable of emitting light by themselves. Thus, incident light from an external source is required to display an image. Therefore, a backlight unit (BLU) for emitting light is typically employed, where this BLU is positioned at the rear of its LCD.

A cold cathode fluorescent lamp (CCFL) has traditionally been used as a light source for many BLUs. However, as sizes of the LCDs become larger, when a CCFL is used as the BLU light source, luminance uniformity can become compromised, which may result in deterioration of color purity.

Recently, a BLU using three color LEDs has been developed, and the BLU using these three color LEDs as a light source can produce high color purity, thereby being advantageous for use in high quality display devices. However, BLUs with three color LEDs often are expensive as compared with BLUs using CCFLs. In order to overcome such a drawback, a white LED is being developed in which light emitted from a single color LED chip is converted into white light.

However, while white LEDs are economically feasible, their color purity and color reproducibility are low, and thus efforts for using a semiconductor nanocrystal BLU have been recently made to improve color reproducibility and color purity and to ensure price competitiveness.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a quantum dot panel, a light unit, and a display device including the same that may improve reliability of the quantum dot panel and simplify a manufacturing process thereof by containing quantum dots within a predetermined space.

An exemplary embodiment of the present invention provides a quantum dot panel, including: a first substrate; a plurality of first cavities formed on the first substrate, so that adjacent ones of the cavities are separated from each other; a first roof layer covering the cavities so as to at least partially define the cavities; quantum dots contained in the first cavities; and a distribution layer in which the quantum dots are distributed and which is disposed within the first cavities.

The first cavities may be arranged in a matrix configuration having columns and rows; first cavities adjacent to each other in a row direction may be arranged to have first valleys positioned therebetween, and first cavities adjacent to each other in a column direction may be arranged to include second valleys therebetween.

Each first valley may include: a first injection hole exposing an interior of one of the first cavities; and a first capping layer formed over the first substrate, to cover the first injection hole so as to thereby seal the one of the first cavities.

The quantum dot may include a yellow quantum dot.

The quantum dot panel may further include a first partition wall that is formed within one of the first cavities, to divide the one of the first cavities into a first subcavity and a distinct second subcavity, and a color of quantum dots of the first subcavity may be different from a color of those of the second subcavity.

The first cavities may each have one of the first subcavity and one of the second subcavity, positioned so as to form a first side subcavity and a second side subcavity. The first side subcavity of one of the first cavities, and the second side subcavity of an immediately adjacent one of the first cavities in the row direction, may each have quantum dots of the same color.

The quantum dots may include a red quantum dot and a green quantum dot.

The distribution layer may comprise a transparent liquid.

The quantum dot panel may further include: a second substrate that faces the first substrate; a plurality of second cavities formed on the second substrate and arranged in a matrix configuration having columns and rows; a second roof layer covering the second cavities so as to at least partially define the second cavities; a second capping layer formed on the roof layer; quantum dots contained in the second cavities; and a distribution layer within which the quantum dots are distributed and which is disposed inside the second cavities, wherein a color of quantum dots contained in the first cavities may be different from a color of those contained in the second cavities.

The quantum dot panel may further include: a first partition wall that is formed within one of the first cavities, and that divides the one of the first cavities into a first subcavity and a distinct second subcavity; and a second partition wall that is formed within one of the second cavities, and that divides the one of the second cavities into a third subcavity and a distinct fourth subcavity.

A color of the quantum dots contained in the first cavities may be red, and a color of the quantum dots contained in the second cavities may be green.

Another embodiment of the present invention provides a light unit, including: a light source; and a quantum dot panel that is disposed adjacent to the light source, thereby positioned so as to convert incident light from the light source into white light and to thereby emit the white light, wherein the quantum dot panel includes: a first substrate; a plurality of first cavities formed on the first substrate so that adjacent ones of the cavities are separated from one another; a first roof layer covering the cavities so as to at least partially define the cavities; quantum dots contained in the first cavities; and a distribution layer in which the quantum dots are distributed and which is disposed within the first cavities.

The light source may include a light-source housing and a plurality of light emitting diodes (LEDs), the LEDs may be formed to be separated from the light-source housing by a predetermined distance, and the first cavities may be formed at positions corresponding to the LEDs.

Yet another embodiment of the present invention provides a display device, including: a display panel; a light guide panel disposed under the display panel; a light source positioned at a lateral surface of the light guide panel; and a quantum dot panel that is disposed between the light guide panel and the light source, and that is configured to convert incident light from the light source into white light so as to emit the white light, wherein the quantum dot panel includes: a first substrate; a plurality of first cavities formed on the first substrate so that adjacent ones of the cavities are separated from each other; a first roof layer covering the cavities so as to at least partially define the cavities; quantum dots contained in the first cavities; and a distribution layer in which the quantum dots are distributed and which is disposed within the first cavities.

According to an embodiment of the present invention, it is possible to improve reliability of the quantum dot panel and to simplify a manufacturing process thereof by containing quantum dots within a predetermined or predefined volume or volumes.

BRIEF DESCRIPTION OF THE DRAWINGS

FIGS. 1A and 1B are perspective views of a light unit and a display device according to an exemplary embodiment of the present invention.

FIG. 2 is a cross-sectional view of FIG. 1A taken along the line II-II.

DETAILED DESCRIPTION OF THE EMBODIMENTS

Figure 1A:
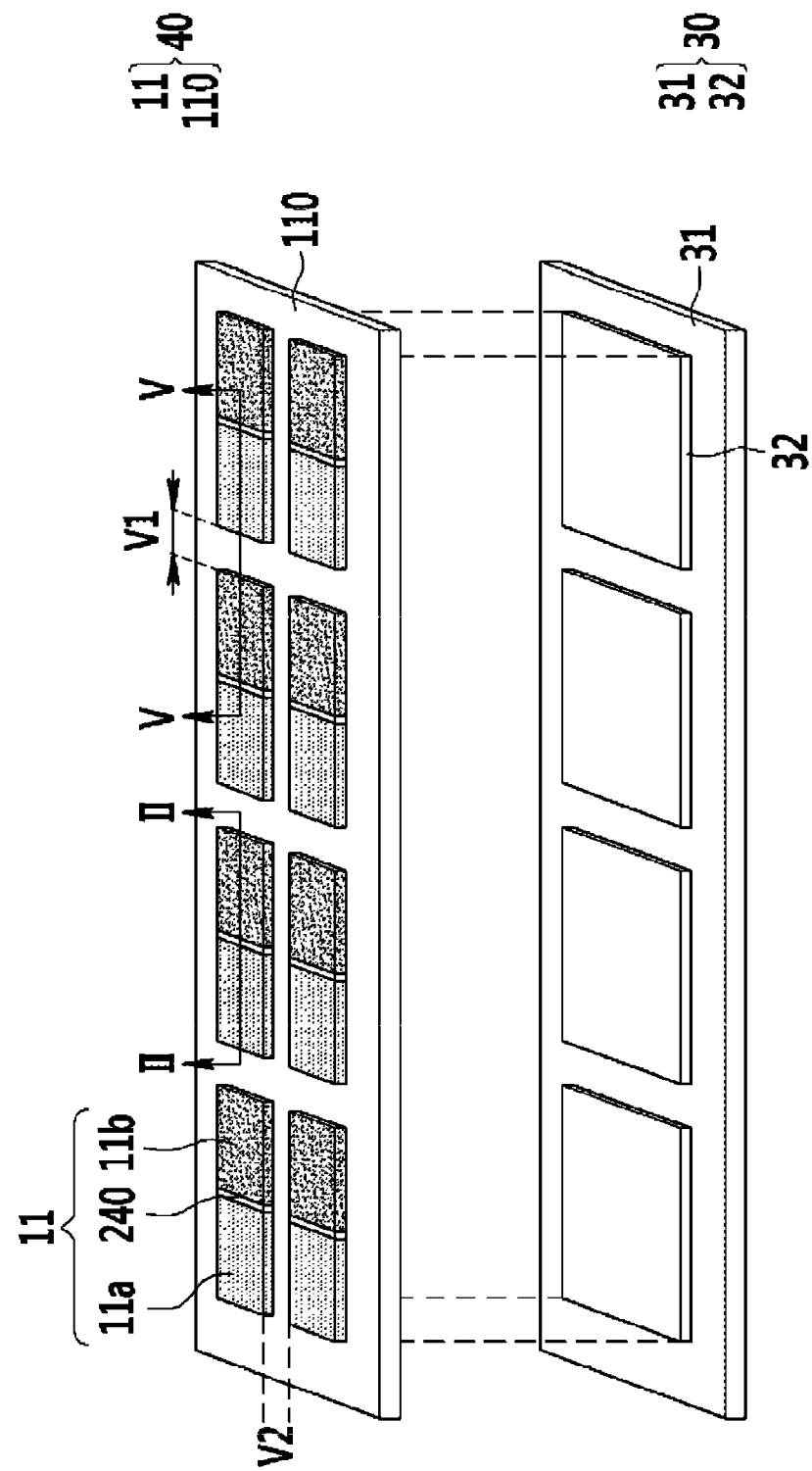

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Furthermore, different features of the various embodiments, disclosed or otherwise understood, can be mixed and matched in any manner to produce further embodiments within the scope of the invention.

In the drawings, the thickness of layers, films, panels, regions, etc., are exaggerated for clarity. Accordingly, the various Figures are not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. All numerical values are approximate, and may vary. All examples of specific materials and compositions are to be taken as nonlimiting and exemplary only. Other suitable materials and compositions may be used instead.

A light unit and a display device including a quantum dot panel (or a quantum dot bar) according to an exemplary embodiment of the present invention will now be described with reference to FIG. 1.

FIGS. 1A and 1B are perspective views of a light unit and a display device according to an exemplary embodiment of the present invention. Referring to FIGS. 1A and 1B, a display device according to the exemplary embodiment of the present invention includes a quantum dot panel 40, a light source assembly 30, a light guide panel 20, and a display panel 50.

The display panel 50 may be a liquid crystal display (LCD) panel that displays images. One of ordinary skill in the art will realize, however, that embodiments of the invention are not limited to implementation in LCD panels, but instead may employ any type of display that requires a light source.

The light guide panel 20 may include a light-incident surface and a light-emitting surface. The light guide panel 20 may guide incident light that is incident on the light-incident surface to the light-emitting surface that is adjacent to the display panel 40, and the display panel 40 may display images using the light from the light guide panel 20.

The light guide panel 20 may made of a light transmissive or light conducting material, for example, a plastic material such as an acryl-based transparent resin PMMA or a polycarbonate (PC)-based material. In some exemplary embodiments, predetermined shapes of patterns may be formed on a rear surface of the light guide panel 20. Embodiments of the invention contemplate any shape, material(s), and surface configuration of light guide panel 20.

The light source assembly 30 may be positioned at a lateral surface of the light guide panel 20, may support one or more light sources 32, and may include a light source housing 31 for supplying electric power. Each light source 32 may be an LED, particularly, a blue light-emitting LED, but it is not limited thereto. The light source housing 31 may be an element that supports the light source 32, for example a circuit board, but it is not limited thereto.

The quantum dot panel 40 may be disposed between the light-incident surface (not shown) of the light guide panel 20 and the light source 32 of the light source assembly 30. The quantum dot panel 40 may include a plurality of spaces 11, or cavities, spaced apart from each other on a transparent substrate 110.

The spaces/cavities 11 may be formed and disposed in a matrix form, i.e. regularly arranged in rows and columns, wherein the number of columns or rows may be one or more. However, it should be noted that embodiments of the invention are not limited to any particular number or arrangement of spaces.

The spaces 11 disposed in the column-row matrix form as shown include a first valley separated from each other between first spaces that are adjacent in a row direction (e.g. the horizontal direction of FIG. 1A), and second valleys separated from each other between the first spaces that are adjacent in a column direction (e.g. the vertical direction of FIG. 1A).

In this case, the substrate 110 may be a glass substrate or a transparent plastic substrate, but it is not limited thereto.

Each space or cavity 11 includes a first partition wall 240 dividing the space into a first subspace or subcavity 11a and a second subspace or subcavity 11b. The first subspace 11a and the second subspace 11b are both included within the space 11.

The first subspace 11a and the second subspace 11b may contain quantum dots of different colors from each other, and the space 11 may be positioned at a position corresponding to the light source 32 disposed at the light source assembly 30. That is, each light source 32 may have a corresponding space 11 positioned above it.

Each first and second subspace 11a and 11b may include red quantum dots or green quantum dots. However, embodiments of the invention are not strictly limited to these colors, and any other colors are contemplated as well.

Hereinafter, the space 11 of the quantum dot panel according to the exemplary embodiment of the present invention will be described in further detail with reference to FIG. 2.

FIG. 2 is a cross-sectional view of FIG. 1A taken along the line II-II. Referring to FIG. 2, the space 11 formed on the quantum dot panel 40 according to the exemplary embodiment of the present invention includes the substrate 110, the first partition wall 240 formed on the substrate 110, the first and second subspaces 11a and 11b topped by the roof layer 360, a distribution layer 19 filling the space 11, and quantum dots 13 and 15 distributed within the distribution layer 19. A capping layer 390 may be formed on the roof layer 360 while also covering a lateral surface (i.e. sides) of the space 11.

The substrate 110 may be a glass substrate or a transparent plastic substrate. In addition, the substrate 110 may be a substrate made of a transparent material with low oxygen and moisture transmittance.

The spaces 11 or cavities each include a color conversion portion 12 that includes the partition wall 240 that divides its space 11 into a first subspace or subcavity 11a and a second subspace or subcavity 11b, the quantum dots 13 and 15, and the distribution layer 19 in which the quantum dots 13 and 15 are distributed.

The distribution layer 19 may be made of a material in a liquid state. This material may include ethanol or the like, but it is not limited thereto. In the exemplary embodiment of the present invention, the distribution layer 19 is in a liquid state.

Red quantum dots 13 and green quantum dots 15, which may implement color reproducibility and color purity, may be respectively distributed within the first subspace 11a and the second subspace 11b of the quantum dot panel 40 according to the exemplary embodiment of the present invention.

In one embodiment, in two spaces 11 that are adjacent in the row direction, the adjacent second subcavity 11b and first subcavity 11a may contain quantum dots 13 and 15 of the same color.

The quantum dots 13 and 15 may be selected from a group II-VI compound, a group IV-VI compound, a group IV element, a group IV compound, and a combination thereof.

The group II-VI compound may be selected from: a group of two-element compounds selected from CdSe, CdTe, ZnS, ZnSe, ZnTe, ZnO, HgS, HgSe, HgTe, MgSe, MgS, and a mixture thereof; a group of three-element compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a group of four-element compounds selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. A group III-V compound may be selected from: a group of two-element compounds selected from GaN, GaP, GaAs, GaSb, AlN, AlP, AlAs, AlSb, InN, InP, InAs, InSb, and a mixture thereof; a group of three-element compounds selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a group of four-element compounds selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The group IV-VI compound may be selected from: a group of two-element compounds selected from SnS, SnSe, SnTe, PbS, PbSe, PbTe, and a mixture thereof; a group of three-element compounds selected from SnSeS, SnSeTe, SnSTe, PbSeS, PbSeTe, PbSTe, SnPbS, SnPbSe, SnPbTe, and a mixture thereof; and a group of four-element compounds selected from SnPbSTe, SnPbSeTe, SnPbSTe, and a mixture thereof. The group IV element may be selected from a group of Si, Ge, and a mixture thereof. The group IV compound may be a two-element compound selected from a group of SiC, SiGe, and a mixture thereof.

In one embodiment, the quantum dots 13 and 15 may have a full width at half maximum (FWHM) of a light-emitting wavelength spectrum which is less than about 45 nm, or preferably about 40 nm, or more preferably about 30 nm. In these ranges, the color purity and reproducibility of the quantum dot panel 40 can be improved.

In addition, shapes of the quantum dots 13 and 15 are not specifically limited to shapes that are generally used in the related art, but specifically, it is desirable that a nanoparticle having a spherical, pyramidal, multi-arm, or cubic shape, a nanotube, a nanowire, a nanofiber, or a planar nanoparticle are used. Indeed, any suitable shape or combination of shapes is contemplated.

The color conversion portion 12 may further include an inorganic oxide, and the inorganic oxide may be selected from silica, alumina, titania, zirconia, and a combination thereof. The inorganic oxide may act as a light-diffusing material.

A roof layer 360 covering the space/cavity 11 may be formed on a top surface of the color conversion portion 12 containing the quantum dots 13 and 15, and a capping layer 390 may be formed on the roof layer 360. The roof layer 360 and the capping layer 390 may each be formed of a transparent organic or inorganic material with low oxygen transmittance and moisture transmittance.

In addition, a protective film (not shown) may be further formed on an external surface of the quantum dot panel 40, that is, on a surface of the substrate 110 and the capping layer 390 that do not contact the color conversion portion 12. The protective film, as a release film, may be made of a polyester such as polyethylene or terephthalate.

Quantum dots that are typically used as a color conversion material are vulnerable to moisture, and are rapidly oxidized in the air. That is, quantum dots are unstable chemical materials, and as such are manufactured in a film form using a barrier film, or manufactured in a glass tube form in which quantum dots are injected into a glass tube.

In either case, red quantum dots and green quantum dots may be distributed together in a polymer layer including a material such as a polymer resin. When the red quantum dots and the green quantum dots are manufactured in a state distributed together within the polymer layer, accuracy of color conversion may be adjusted depending on an amount of light emitted from the light source as a way to adjust an amount of the quantum dots for proper degree of color conversion. That is, the amount of each color of quantum dot may be adjusted as desired to achieve a desired degree of color conversion.

An LED light source may be used as a light source of a liquid crystal display, where LEDs are formed at predetermined intervals from a light source housing. As described above, as conventional quantum dot films or quantum dot glass tubes are continuously formed, color deviation may occur between a position of the LED light source and intervals of adjacent LED light sources. That is, display color may vary with position, with colors between light sources being different than colors nearby or above light sources.

For example, when a conventional quantum dot glass tube is disposed in front of blue LED light sources, display areas near a blue LED light source and display areas between adjacent blue LED light sources may exhibit different colors.

Therefore, the quantum dot panel 40 according to the exemplary embodiment of the present invention may employ color conversion portions 12 that include a space 11 or cavity formed at a position corresponding/proximate to the light source 32 of the light source assembly 30, and the quantum dots 13 and 15 contained in the space 11, thereby improving color purity and color reproducibility. In addition, an amount of the quantum dots 13 and 15 contained in the space 11 may be adjusted by, for example, adjusting an area or a thickness of the space 11, thereby easily adjusting accuracy of color conversion depending on an amount of light emitted by the light source 32.

Further, since the quantum dots 13 and 15 are contained in the space 11 while being sealed by the roof layer 360 and the capping layer 390, moisture and oxygen transmittance is lower than that of a conventional quantum dot film or quantum dot glass tube, thereby improving reliability.

Hereinafter, a quantum dot panel according to an exemplary embodiment of the present invention will be described with reference to FIGS. 3 and 4.

Figure 3:
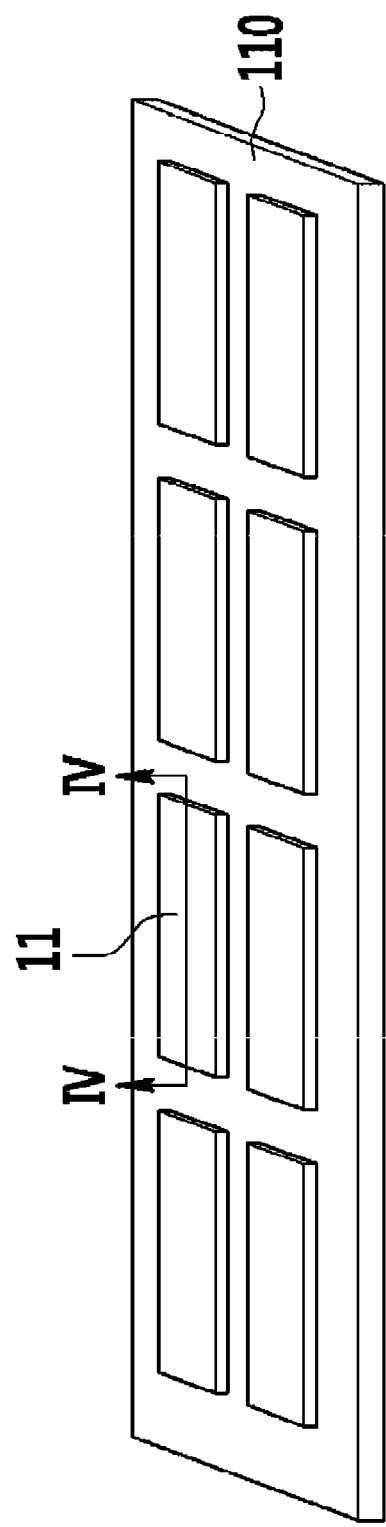
FIG. 3 is a perspective view of quantum dot panel according to an exemplary embodiment of the present invention.
Figure 4:
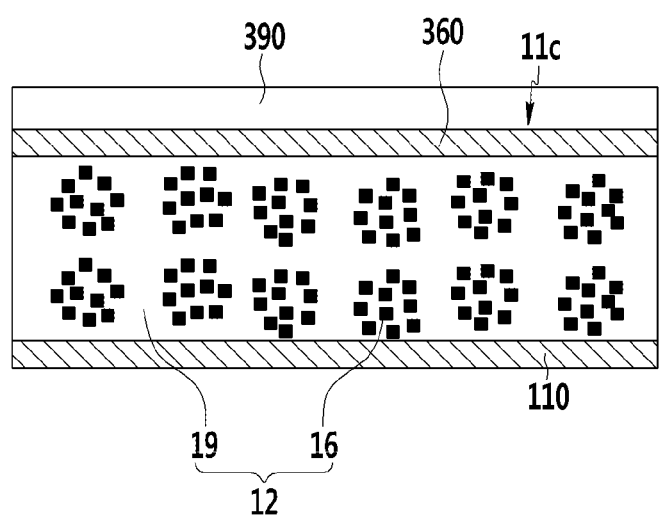
FIG. 4 is a cross-sectional view of FIG. 3 taken along the line IV-IV.

FIG. 3 is a perspective view of quantum dot panel according to an exemplary embodiment of the present invention, and FIG. 4 is a cross-sectional view of FIG. 3 taken along the line IV-IV. Since the quantum dot panels shown in FIGS. 3 and 4 are substantially the same as the quantum dot panels illustrated in FIGS. 1 and 2 except for a structure of the space 11 and a type of quantum dot 16, any redundant description will be omitted.

Referring to FIGS. 3 and 4, a quantum dot panel 40 according to the exemplary embodiment of the present invention includes a plurality of spaces 11 formed on the substrate 110, and each of the spaces/cavities 11 may form one distinct and continuous space because there is no partition wall therein.

Referring to FIG. 4, a color conversion portion 12 of the quantum dot panel 40 may contain a distribution layer 19 in a liquid state, as well as yellow quantum dots 16 distributed within the distribution layer 19 to implement color reproducibility and color purity. While yellow quantum dots 16 are given here as a specific example, other embodiments contemplate spaces 11 with a single cavity within, that contain quantum dots of any color or combination of colors.

Hereinafter, a quantum dot panel according to another exemplary embodiment of the present invention will be described with reference to FIG. 5.

Figure 5:
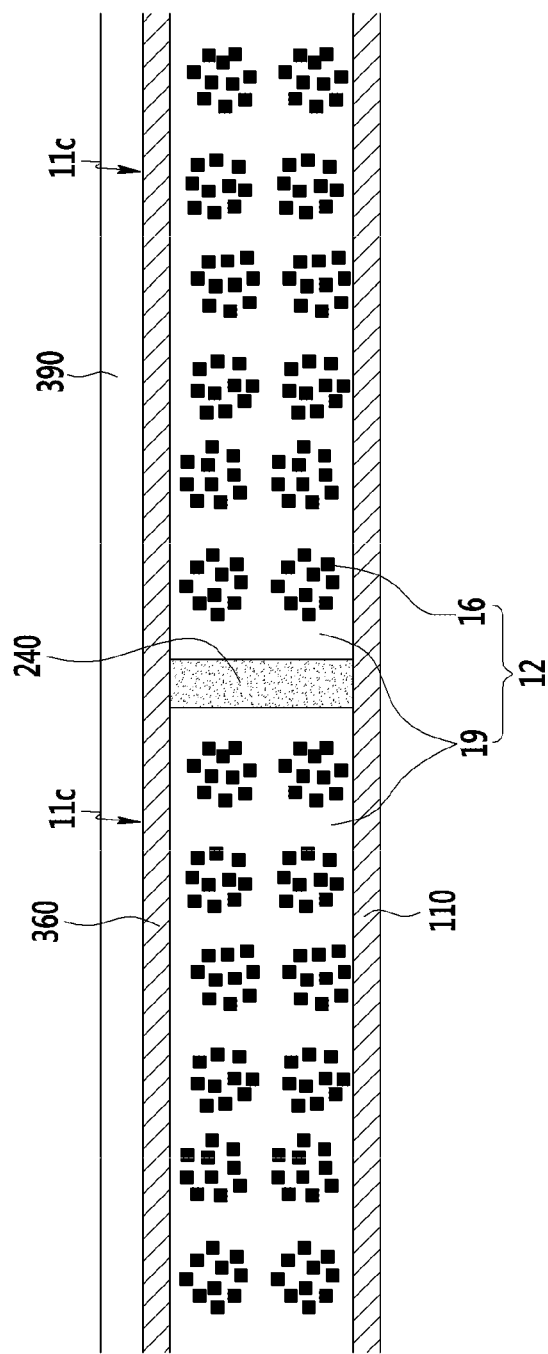
FIG. 5 is a perspective view of a quantum dot panel according to another exemplary embodiment of the present invention.

FIG. 5 is a perspective view of a quantum dot panel according to another exemplary embodiment of the present invention. Since the quantum dot panel according to another exemplary embodiment of the present invention illustrated in FIG. 5 is substantially the same as that of the exemplary embodiment illustrated in FIGS. 1 and 2 except for the types of quantum dots 16, redundant description will be omitted.

Referring to FIG. 5, each color conversion portion 12 included in a first subspace 11a and a second subspaces 11b of the quantum dot panel 40 may contain a liquid distribution layer 19, and yellow quantum dots 16 distributed within the distribution layer 19 to implement color reproducibility and color purity.

A quantum dot panel according to another exemplary embodiment of the present invention will be described with reference to FIG. 6.

Figure 6:
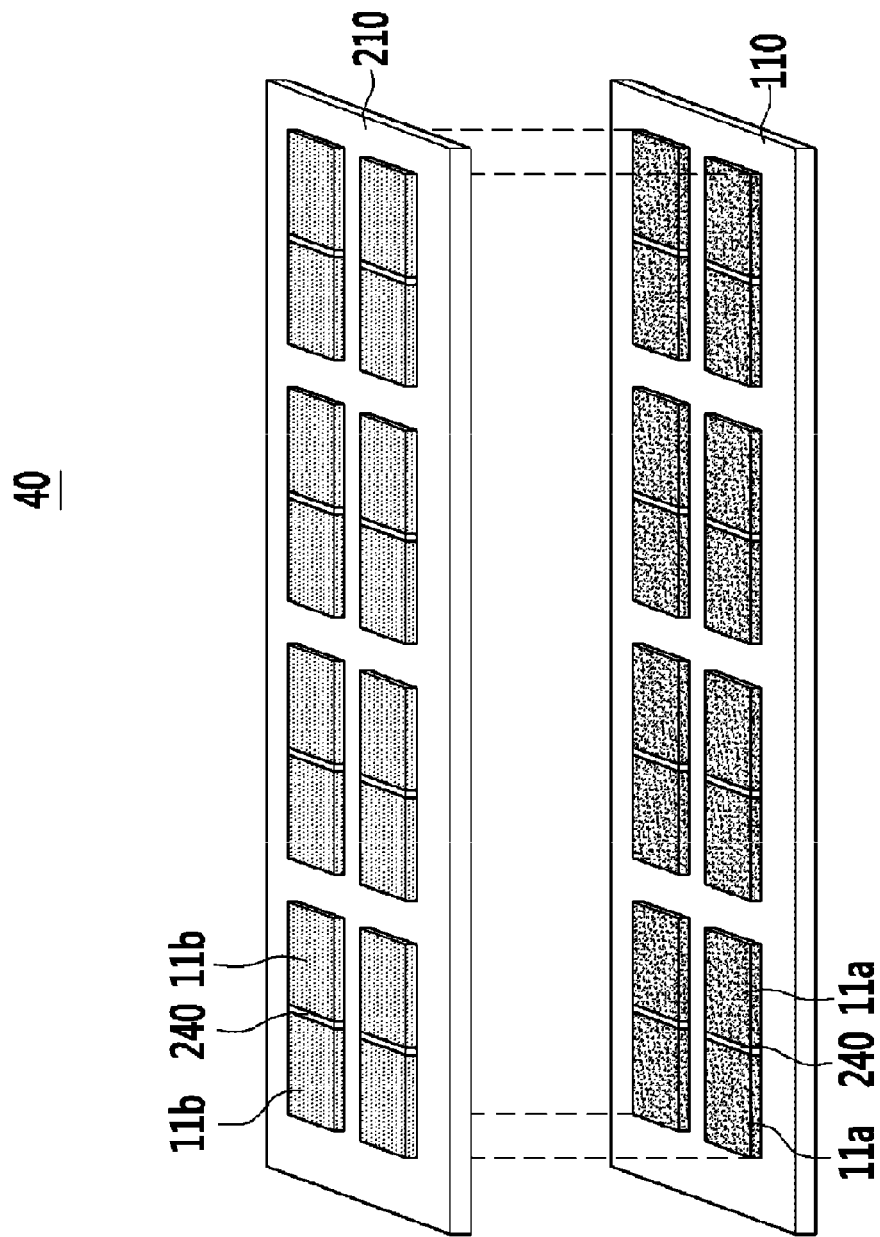
FIG. 6 is a perspective view of a quantum dot panel according to the other exemplary embodiment of the present invention.

FIG. 6 is a perspective view of quantum dot panel according to a further exemplary embodiment of the present invention. Detailed discussion of elements that have already been described will be omitted for clarity.

As shown in FIG. 6, the quantum dot panel 40 according to this exemplary embodiment of the present invention may include a first substrate 110 and a second substrate 210. A first subspace 11a formed on the first substrate 110 may contain red quantum dots 13, and a second subspace 11b formed on the second substrate 210 may contain green quantum dots 15. The subspaces themselves may be constructed as previously described above. Each of the subspaces 11a, 11b may be positioned to correspond to a light source 32, as in previous embodiments.

The quantum dot panel 40 may have a structure in which the first substrate 110 containing the red quantum dots 13 is disposed at a lower position and the second substrate 210 containing the green quantum dots 15 is disposed at an upper position. That is, within the panel 40, substrate 210 may be positioned atop substrate 110. In this case, a bottom surface of the second substrate 210 may be directly attached to the first subspace/subcavity 11a containing the red quantum dots 13, so that the second space 11a formed on a top surface of second substrate 210 is coupled, e.g. affixed, to the first subspace/subcavity 11a.

Based on a spectrum of white light passing through a color conversion portion 12, since the red quantum dots 13 re-absorb green light that has a shorter wavelength than that of red light, the emitted red light and the green light may not be balanced.

When the quantum dot panel 40 is formed with the structure shown, where the first substrate 110 containing the red quantum dots 13 is disposed at a lower position and the second substrate 210 containing the green quantum dots 15 is disposed at an upper position, imbalance between the red light and the green light may be improved, thereby increasing light efficiency.

Figure 7:
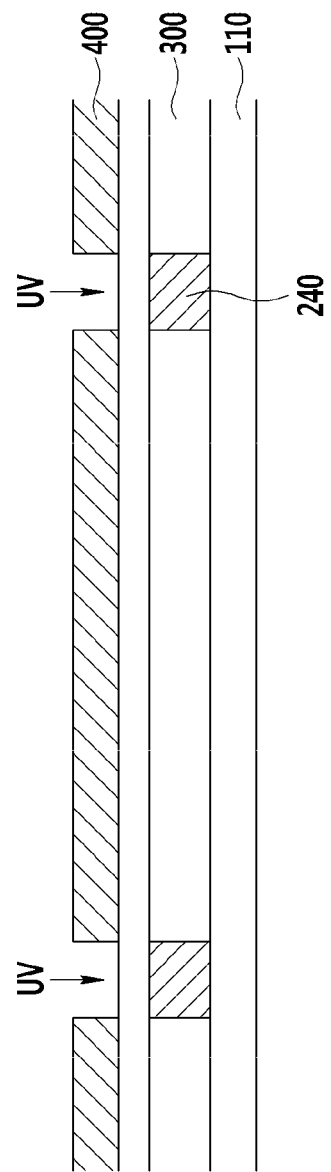
FIGS. 7 to 10 are cross-sectional views sequentially illustrating a process of manufacturing a quantum dot panel according to an exemplary embodiment of the present invention that is based on a cross-sectional view taken along the line V-V of FIG. 1.

A manufacturing method for a quantum dot panel according to an exemplary embodiment of the present invention will now be described with reference to FIGS. 7 and 10. FIGS. 7 to 10 are cross-sectional views sequentially illustrating a process of manufacturing the quantum dot panel according to exemplary embodiments of the present invention based on a cross-sectional view of FIG. 1 taken along the line V-V.

First, referring to FIG. 7, a negative photoresist is deposited on a substrate 110 made of a transparent material such as a glass, a plastic, and the like, so as to form sacrificial layer 300.

The sacrificial layer 300 is formed to be connected in only a row direction of a plurality of spaces to be formed on the substrate 110, and is formed and disposed to be separated in a column direction thereof. In other words, the sacrificial layer 300 is not present in the second valley V2.

A first mask 400 is disposed on substantially an entire surface of the substrate 110, where this mask exposes the regions where the partition walls 240 are to be formed. After the first mask 400 is deposited, UV light is irradiated to harden the sacrificial layer 300 positioned to correspond to the partition wall 240.

Figure 8:
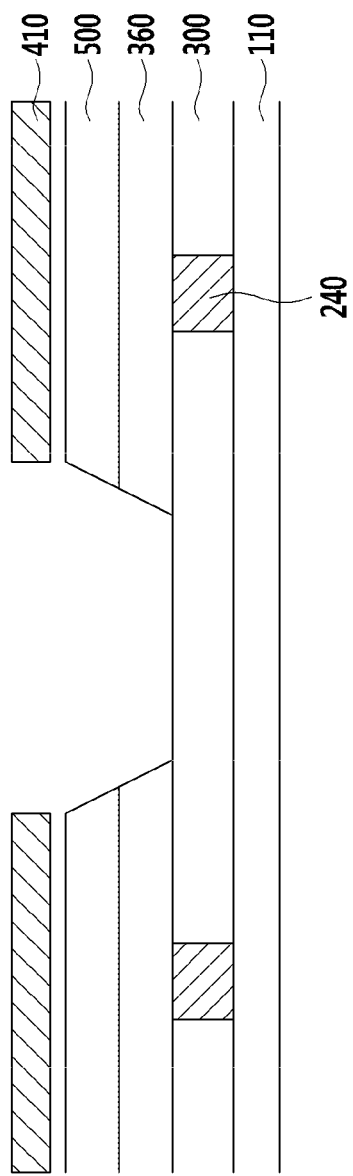

Next, referring to FIG. 8, an organic material is applied over substantially an entire surface of the sacrificial layer 300 to form a roof layer 360, and then a positive photoresist 500 is applied over substantially an entire surface of the roof layer 360.

A second mask 410 is then deposited on the positive photoresist 500, with openings that expose first valleys V1. UV light is then irradiated to pattern the positive photoresist 500 at the first valleys V1.

When that portion of the positive photoresist 500 corresponding to the first valleys V1 is removed, dry etching is then performed using the remaining photoresist 500 as a mask. This acts to pattern the roof layer 360 is formed to be connected along a column of spaces 11.

Figure 9:
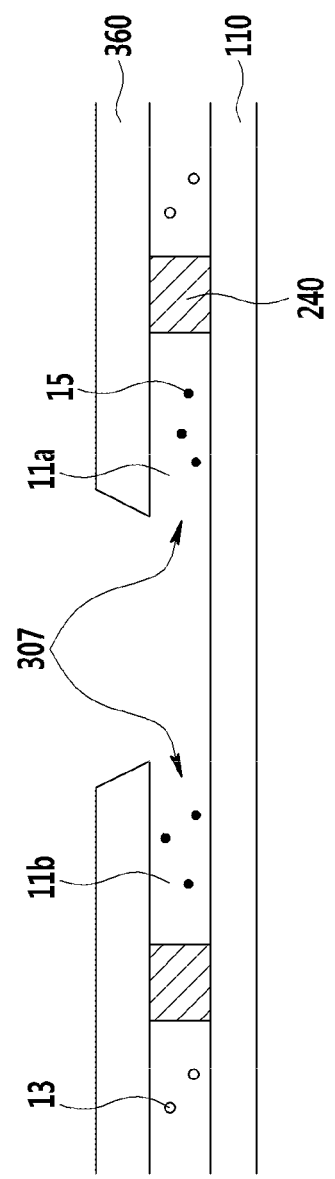
Figure 10:
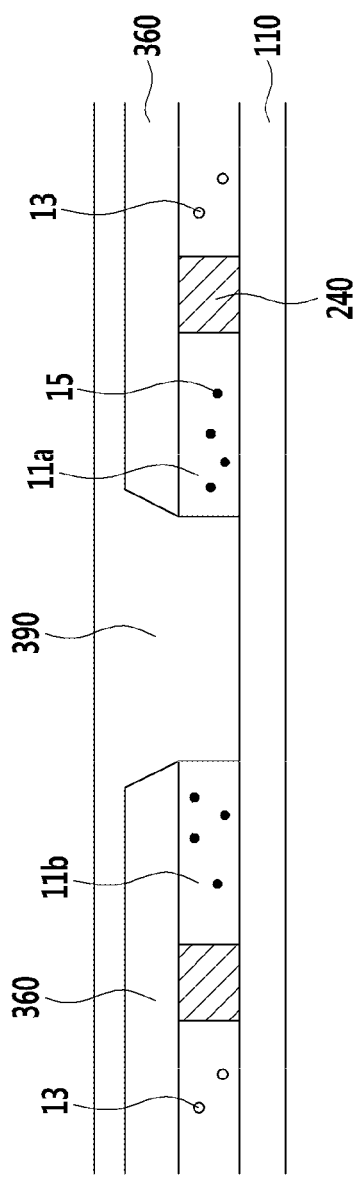

Next, as shown in FIG. 9, the sacrificial layer 300 is entirely removed through etching to form space 11, including injection hole 307.

The substrate 110 and the roof layer 360 are separated from each other by spaces 11 interposed therebetween, and the roof layer 360 is supported by the partition wall 240. A top surface and a lateral wall of the space 11 in a column direction are formed to be covered by the roof layer 360.

The injection hole 307 forms an opening into space 11, and the injection hole 307 is formed along the first valley V1.

Next, the substrate 110 is heated to harden the roof layer 360, so that the roof layer 360 is able to maintain its shape.

Then, distribution layer 19, including quantum dots 13 and 15, is dripped on the substrate 110 by an inkjet method or a dispensing method, so that quantum dots 13 and 15 are injected into the space/cavity 11 through the injection hole 307. In other words, the quantum dots 13 and 15 may be injected into the space 11 through the injection hole 307 formed on the first valley V1.

In this case, quantum dots 13 and 15 of the same color may be injected into the second subspaces 11b and the first subspaces 11a that are adjacent to each other on opposite sides of each first valley V1 (e.g., the second subspace 11b of the space 11 on the right side of a column, and the neighboring first subspace 11a of the space 11 on the left side of the next column to the right).

The material that forms the distribution layer 19 including the quantum dots 13 and 15 is in a liquid state such that it enters the cavity 11 by capillary force through the injection hole 307.

Lastly, as shown in FIG. 10, the capping layer 390 is formed over substantially an entire surface of the substrate 110. The capping layer 390 is formed to cover the injection holes 307, thereby sealing the spaces 11 and completing the quantum dot panel according to the exemplary embodiment of the present invention.

As described above, the quantum dot panel according to exemplary embodiments of the present invention includes quantum dots contained in spaces having a predetermined structure formed on the substrate, thereby improving reliability of the quantum dot panel and simplifying the manufacturing process thereof.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 40: quantum dot panel | 12: color conversion portion |
| 13, 15, 16: quantum dot | 19: distribution layer |
| 30: light source assembly | 32: light source |
| 31: light source housing | 11: space |
| 240: partition wall | 110: substrate |
| 360: roof layer | 390: capping layer |
| 400, 410: first, second mask | 300: sacrificial layer |
| 500: photoresist | 307: injection hole |

What is claimed is:

1. A quantum dot panel, comprising:
a first substrate;
a plurality of first cavities formed on the first substrate, so that adjacent ones of the first cavities are separated from each other;
a first roof layer covering the first cavities so as to at least partially define the first cavities;
quantum dots contained in the first cavities; and
a distribution layer in which the quantum dots are distributed and which is disposed within the first cavities,
wherein a valley is positioned between two adjacent cavities of the first cavities that immediately neighbor each other.

2. The quantum dot panel of claim 1, wherein:
the first cavities are arranged in a matrix configuration having columns and rows; and
first cavities adjacent to each other in a row direction are arranged to have first valleys positioned therebetween, and first cavities adjacent to each other in a column direction are arranged to include second valleys therebetween.

3. The quantum dot panel of claim 2, wherein
each first valley includes: a first injection hole exposing an interior of one of the first cavities: and
a first capping layer formed over the first substrate to cover the first injection hole so as to thereby seal the one of the first cavities.

4. The quantum dot panel of claim 3, wherein
the quantum dots include a yellow quantum dot.

5. The quantum dot panel of claim 3, further comprising
a first partition wall that is formed within one of the first cavities, and that divides the one of the first cavities into a first subcavity and a distinct second subcavity,
wherein a color of the quantum dots of the first subcavity is different from a color of the quantum dots of the second subcavity.

6. The quantum dot panel of claim 5, wherein
the first cavities each have one of the first subcavity and one of the second subcavity, positioned so as to form a first side subcavity and a second side subcavity; and
the first side subcavity of one of the first cavities, and the second side subcavity of an immediately adjacent one of the first cavities in the row direction, each have quantum dots of the same color.

7. The quantum dot panel of claim 5, wherein
the quantum dots include a red quantum dot and a green quantum dot.

8. The quantum dot panel of claim 3, further comprising:
a second substrate that faces the first substrate; a plurality of second cavities formed on the second substrate and arranged in a matrix configuration having columns and rows;
a second roof layer covering the second cavities so as to at least partially define the second cavities;
a second capping layer formed on the roof layer;
quantum dots contained in the second cavities; and
a distribution layer within which the quantum dots are distributed and which is disposed inside the second cavities,
wherein a color of the quantum dots contained in the first cavities is different from a color of the quantum dots contained in the second cavities.

9. The quantum dot panel of claim 8, further comprising:
a first partition wall that is formed within one of the first cavities, and that divides the one of the first cavities into a first subcavity and a distinct second subcavity; and
a second partition wall that is formed within one of the second cavities, and that divides the one of the second cavities into a third subcavity and a distinct fourth subcavity.

10. The quantum dot panel of claim 8, wherein
a color of the quantum dots contained in the first cavities is red, and
a color of the quantum dots contained in the second cavities is green.

11. The quantum dot panel of claim 1, wherein
the distribution layer comprises a transparent liquid.

12. A light unit, comprising:
a light source; and
a quantum dot panel that is disposed adjacent to the light source, thereby positioned so as to convert incident light from the light source into white light and to thereby emit the white light,
wherein the quantum dot panel comprises:
    a first substrate;
    a plurality of first cavities formed on the first substrate, so that adjacent ones of the first cavities are separated from each other;
    a first roof layer covering the first cavities so as to at least partially define the first cavities;
    quantum dots contained in the first cavities; and
    a distribution layer in which the quantum dots are distributed and which is disposed within the first cavities,
wherein the first cavities are arranged in a matrix configuration having columns and rows.

13. The light unit of claim 12, wherein
the light unit further comprises a first capping layer formed on the first roof layer.

14. The light unit of claim 13, wherein:
the light source includes a light-source housing and a plurality of light emitting diodes (LEDs);
the LEDs are formed to be separated from the light-source housing by a predetermined distance; and
the first cavities are formed at positions corresponding to the LEDs.

15. The light unit of claim 13, further comprising
a first partition wall that is formed within one of the first cavities, and that divides the one of the first cavities into a first subcavity and a distinct second subcavity,
wherein a color of quantum dots of the first subcavity is different from a color of the quantum dots of the second subcavity.

16. The light unit of claim 12, further comprising:
a second substrate that faces the first substrate;
a plurality of second cavities formed on the second substrate and arranged in a matrix configuration having columns and rows;
a second roof layer covering the second cavities so as to at least partially define the second cavities;
a second capping layer formed on the roof layer; quantum dots contained in the second cavities; and
a distribution layer within which the quantum dots are distributed and which is disposed inside the second cavities,
wherein a color of quantum dots contained in the first cavities is different from a color of the quantum dots contained in the second cavities.

17. A display device, comprising:
a display panel;
a light guide panel disposed under the display panel;
a light source positioned at a lateral surface of the light guide panel; and
a quantum dot panel that is disposed between the light guide panel and the light source, and that is configured to convert incident light from the light source into white light so as to emit the white light,
wherein the quantum dot panel comprises:
    a first substrate;
    first cavities formed in a plurality of cavity columns and a plurality of cavity rows on the first substrate so that adjacent ones of the first cavities are separated from each other;
    a first roof layer covering the first cavities so as to at least partially define the first cavities;
    quantum dots contained in the first cavities; and
    a distribution layer in which the quantum dots are distributed and which is disposed within the first cavities.

18. The display device of claim 17, further comprising a first partition wall that is formed within one of the first cavities, and that divides the first one of the first cavities into a first subcavity and a distinct second subcavity, wherein a color of quantum dots of the first subcavity is different from a color of the quantum dots of the second subcavity.

19. The display device of claim 17, further comprising:
a second substrate that faces the first substrate;
a plurality of second cavities formed on the second substrate and arranged in a matrix configuration having columns and rows;
a second roof layer covering the second cavities so as to at least partially define the second cavities;
a second capping layer formed on the roof layer;
quantum dots contained in the second cavities; and
a distribution layer within which the quantum dots are distributed and which is disposed inside the second cavities,
wherein a color of quantum dots contained in the first cavities is different from a color of the quantum dots contained in the second cavities.

20. The display device of claim 17, wherein the quantum dots include a red quantum dot and a green quantum dot.

* * * * *